United States Patent [19]

Marker et al.

[11] Patent Number: 5,620,231
[45] Date of Patent: Apr. 15, 1997

[54] SEAT BELT THREADER ASSEMBLY FOR CHILD SAFETY SEATS

[76] Inventors: Duane L. Marker; Mary J. Marker, both of 6906 Kirkwood Club Dr., Indianapolis, Ind. 46241

[21] Appl. No.: 618,168

[22] Filed: Mar. 19, 1996

[51] Int. Cl.⁶ .................. A47D 1/00; B60N 2/26
[52] U.S. Cl. .................. 297/250.1; 297/463.2; 29/278; 81/488
[58] Field of Search .............. 297/250.1, 463.1, 297/463.2, DIG. 6; 81/488; 29/278, 270

[56] References Cited

U.S. PATENT DOCUMENTS

| | | | |
|---|---|---|---|
| 3,145,041 | 8/1964 | Grolig | 81/488 X |
| 5,197,176 | 3/1993 | Reese | 81/488 X |
| 5,444,907 | 8/1995 | Becker | 29/278 X |
| 5,496,083 | 3/1996 | Shouse | 29/278 X |
| 5,500,966 | 3/1996 | Wheat | 81/488 |

*Primary Examiner*—Peter M. Cuomo
*Assistant Examiner*—Anthony D. Barfield

[57] ABSTRACT

A seat belt threader assembly for child safety seats adapted for use in association with a child safety seat including a back member having slots positioned therethrough and a seat belt including a male buckle member, the seat belt being operatively coupled to recoil means, the apparatus comprises a handle formed in an elongated planar configuration with a first end and a second end; and a strap member formed in an elongated planar configuration with a front face including coupling means, the strap member having a first end, a second end and a center point, the first end of the strap member being affixed to the second end of the handle, in an operative orientation a user securing the coupling means of the strap member to the male buckle member of a seat belt, the user then threading the handle, strap member and seat belt through the slots of a baby seat.

1 Claim, 3 Drawing Sheets

SEAT BELT THREADER ASSEMBLY FOR CHILD SAFETY SEATS

BACKGROUND OF THE INVENTION

1. Field of the Invention

The present invention relates to a seat belt threader assembly for child safety seats and more particularly pertains to threading a seat belt through the back of a child safety seat.

2. Description of the Prior Art

The use of seat belt accessories is known in the prior art. More specifically, seat belt accessories heretofore devised and utilized for the purpose of modifying seat belts for a plurality of different uses. are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,248,187 to Harrison discloses a seat belt extension apparatus.

U.S. Pat. No. 4,618,186 to Swanson discloses a child safety restraint.

U.S. Pat. No. 4,741,557 to Jambor et al. discloses a safety-belt arrangement in a vehicle.

U.S. Pat. No. 5,421,615 to Asagiri et al. discloses a seat belt apparatus.

U.S. Pat. No. 4,997,222 to Reed discloses a zipper pull.

U.S. Pat. No. 5,100,191 to Detrick et al. discloses a zipper puller.

U.S. Pat. No. Des. 314,534 to Eubank discloses a zipper pull.

While these devices fulfill their respective, particular objective and requirements, the aforementioned patents do not describe a seat belt threader assembly for child safety seats for threading a seat belt through the back of a child safety seat.

In this respect, the seat belt threader assembly for child safety seats according to the present invention substantially departs from the conventional concepts and designs of the prior art, and in doing so provides an apparatus primarily developed for the purpose of threading a seat belt through the back of a child safety seat.

Therefore, it can be appreciated that there exists a continuing need for new and improved seat belt threader assembly for child safety seats which can be used for threading a seat belt through the back of a child safety seat. In this regard, the present invention substantially fulfills this need.

SUMMARY OF THE INVENTION

In the view of the foregoing disadvantages inherent in the known types of seat belt accessories now present in the prior art, the present invention provides an improved seat belt threader assembly for child safety seats. As such, the general purpose of the present invention, which will be described subsequently in greater detail, is to provide a new and improved seat belt threader assembly for child safety seats and method which has all the advantages of the prior art and none of the disadvantages.

To attain this, the present invention essentially comprises a new and improved seat belt threader assembly for child safety seats comprising, in combination: a child safety seat including a back member having slots positioned therethrough; a seat belt including a male buckle member, the seat belt being operatively coupled to recoil means; a handle fabricated of rigid plastic and formed in an elongated planar rectangular configuration with a first end and a second end, the second end having a central region, the handle having four rounded corners; and a strap member formed in an elongated planar rectangular configuration with a front face and a rear face, the strap member having about one half the length and width of the handle, the strap member being flexible and having a first end, a second end and a center point, the first end of the strap member being formed integrally with the central region of the second end of the handle, the front face of the strap member including female VELCRO coupling means affixed thereto between the center point and first end thereof, the front face of the strap member including male VELCRO coupling means affixed thereto adjacent to the second end thereof, in an operative orientation a user folding the strap member around the male buckle member of the seat belt and tightly coupling the male and female VELCRO coupling means together, the user then threading the handle, strap member and seat belt through the slots of the baby seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved seat belt threader assembly for child safety seats which has all the advantages of the prior art seat belt accessories and none of the disadvantages.

It is another object of the present invention to provide a new and improved seat belt threader assembly for child safety seats which may be easily and efficiently manufactured and marketed.

It is a further object of the present invention to provide a new and improved seat belt threader assembly for child safety seats which is of durable and reliable construction.

An even further object of the present invention is to provide a new and improved seat belt threader assembly for child safety seats which is susceptible of a low cost of manufacture with regard to both materials and labor, and which accordingly is then susceptible of low prices of sale to the consuming public, thereby making such a seat belt threader assembly for child safety seats economically available to the buying public.

Still yet another object of the present invention is to provide a new and improved seat belt threader assembly for child safety seats which provides in the apparatuses and methods of the prior art some of the advantages thereof, while simultaneously overcoming some of the disadvantages normally associated therewith.

Even still another object of the present invention is to provide a new and improved seat belt threader assembly for threading a seat belt through the back of a child safety seat.

Lastly, it is an object of the present invention to provide a new and improved seat belt threader assembly for child safety seats adapted for use in association with a child safety seat including a back member having slots positioned therethrough and a seat belt including a male buckle member, the seat belt being operatively coupled to recoil means, the apparatus comprises a handle formed in an elongated planar configuration with a first end and a second end; and a strap member formed in an elongated planar configuration with a front face including coupling means, the strap member having a first end, a second end and a center point, the first end of the strap member being affixed to the second end of the handle, in an operative orientation a user securing the coupling means of the strap member to the male buckle member of a seat belt, the user then threading the handle, strap member and seat belt through the slots of a baby seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
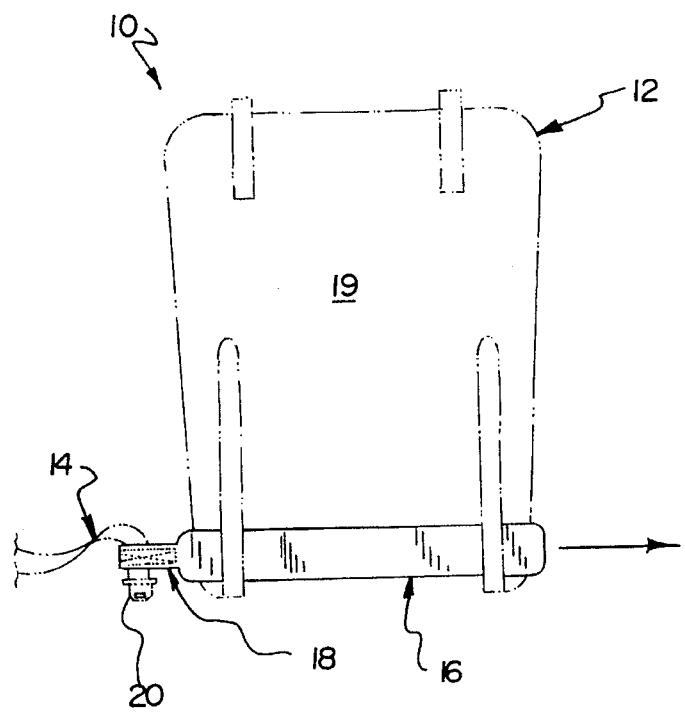
FIG. 1 is a perspective view of the preferred embodiment of the seat belt threader assembly for child safety seats constructed in accordance with the principles of the present invention.

With reference now to the drawings, and in particular, to FIG. 1 thereof, the preferred embodiment of the new and improved seat belt threader assembly for child safety seats embodying the principles and concepts of the present invention and generally designated by the reference number 10 will be described.

Specifically, it will be noted in the various Figures that the device relates to a seat belt threader assembly for child safety seats 10 which is used for threading a seat belt through the back of a child safety seat. In its broadest context, the device consists of a child seat 12, a seat belt 14, a handle 16 and a strap member 18. Such components are individually configured and correlated with respect to each other so as to attain the desired objective.

In the preferred embodiment the apparatus 10 includes a child safety seat 12. The child seat has a back member 19 which includes slots to allow the passage of a seat belt therethrough. In most instances the child seat and other components of the present invention will be utilized in the front or back seat of an automobile. The seat belt 14 of the apparatus includes a male buckle member 20. The seat belt is operatively coupled to recoil means, preferably the recoil means in the door and seat of an automobile. In alternate embodiments only a handle and strap are included with the apparatus. In such embodiments the apparatus is utilized with an existing child seat and vehicle seat belt. Note FIG. 1.

Figure 2:
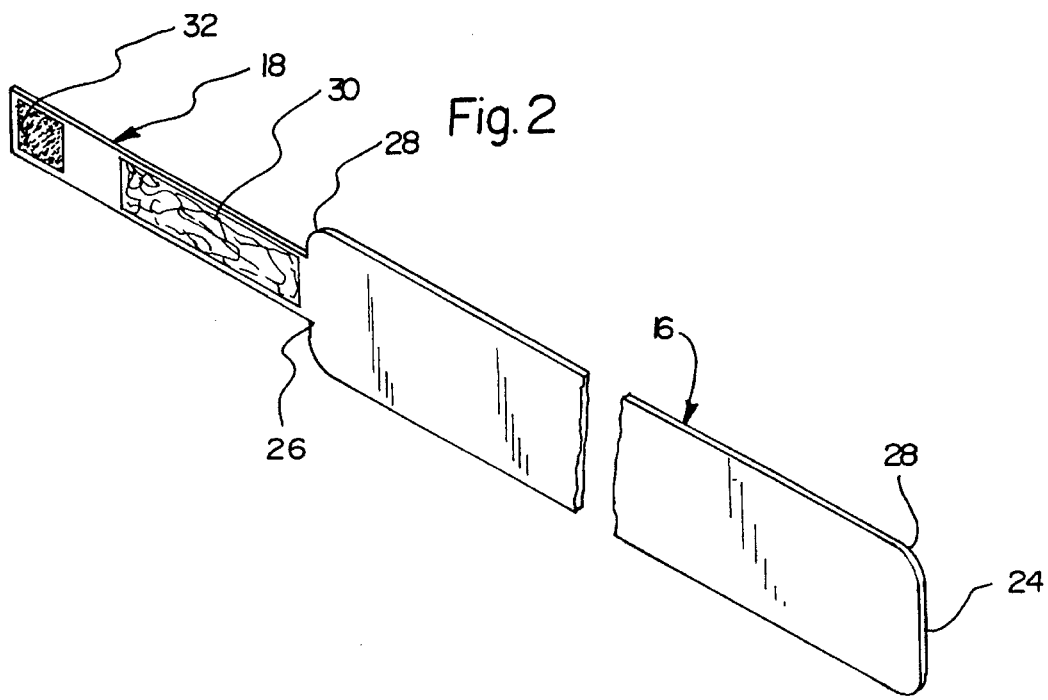
FIG. 2 is an isolated perspective view of the extension belt shown in FIG. 1 illustrating the hook and loop coupling means thereof.

The handle 16 is fabricated of rigid plastic and formed in an elongated planar rectangular configuration with a first end 24 and a second end 26. The width of the handle is between one and two inches. The thickness of the handle is about one quarter inch. The second end has a central region which is formed integrally with the strap. The handle has four smooth rounded corners 28 to prevent injury to users when utilizing the apparatus. Note FIGS. 1 and 2.

The strap member 18 is formed in an elongated planar rectangular configuration with a front face and a rear face. The strap member has about one half the length and width of the handle. The width is between one half and one inch. The entire length of the handle and strap member taken together is between sixteen and twenty four inches. The strap member is flexible and has a first end, a second end and a center point. The first end of the strap member is formed integrally with the central region of the second end of the handle. Note FIGS. 1 and 2.

In the preferred embodiment the front face of the strap member includes female VELCRO coupling means 30 affixed between its center point and first end. The front face of the strap member includes male VELCRO coupling means 32 affixed adjacent to its second end. In an operative orientation a user folds the strap member around the male buckle member 209 of the seat belt and tightly couples the male and female VELCRO coupling means together. The user then threads the handle 16, strap member 18 and seat belt 14 through the slots of the baby seat. The rigid handle of the apparatus is much easier to manipulate than the seat belt itself, thereby facilitating the threading process. This is particularly useful to individuals with use of only one arm, and individuals with limited mobility. Note FIGS. 1 and 2.

Figure 3:
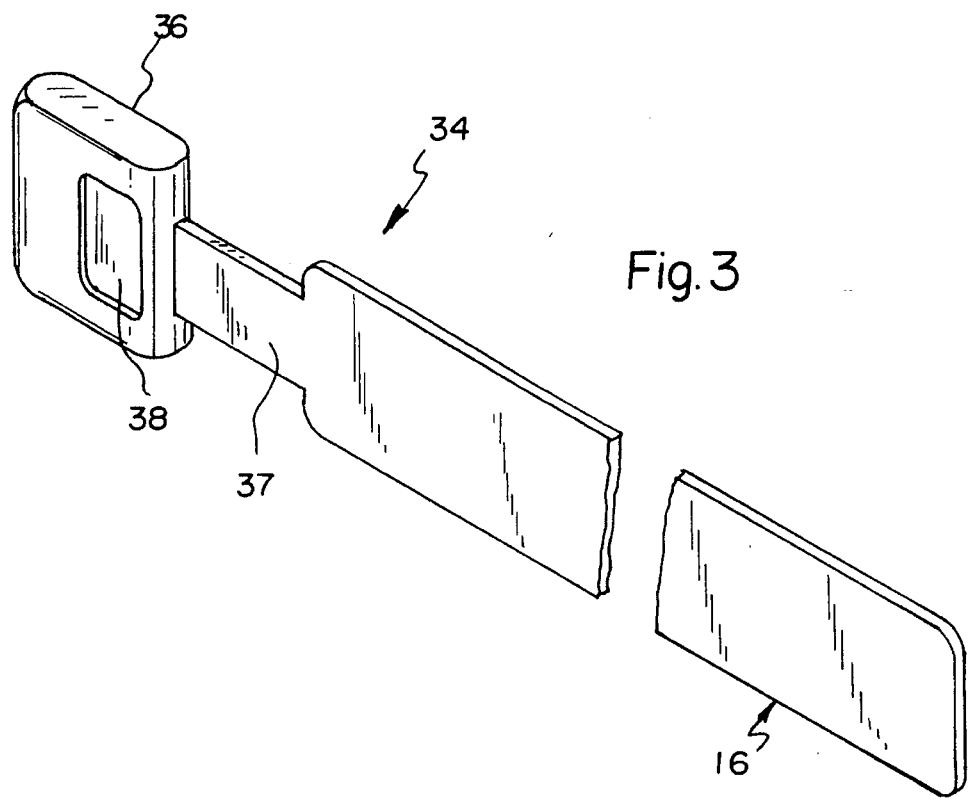
FIG. 3 is an isolated perspective view of the extension belt in a first alternate embodiment illustrating the buckle means thereof.

A first alternate embodiment 34 of the present invention is shown in FIG. 3. Such embodiment includes substantially all of the components of the present invention except that a female seat belt buckle 36 is utilized instead of VELCRO coupling means. Additionally, the strap member 37 is fabricated of rigid material. The female seat belt buckle is formed in a generally rectangular configuration with a slot for receiving and locking a male seat belt buckle within it. The female seat belt buckle includes a release button 38 to unlock and remove the male seat belt buckle when desired. After the female seat belt buckle is coupled to the male seat belt buckle the handle, strap and seat belt are threaded through the baby seat in the manner set forth above. Note FIG. 3.

Figure 4:
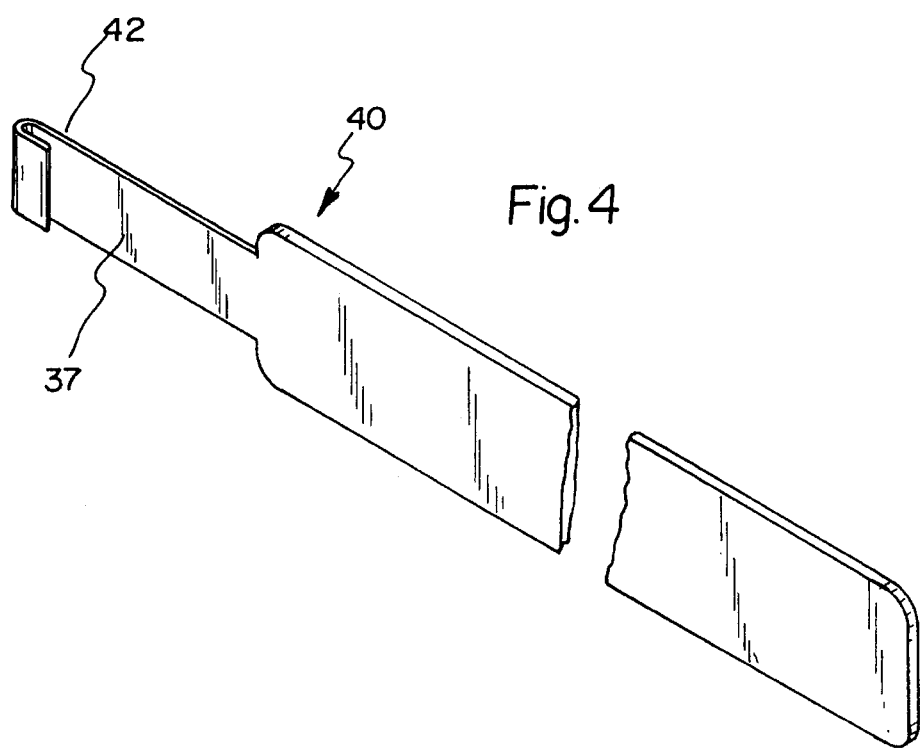
FIG. 4 is an isolated perspective view of the extension belt in a second alternate embodiment illustrating the buckle means thereof.

A second alternate embodiment 40 of the present invention is shown in FIG. 4. Such embodiment includes substantially all of the components of the present invention except that a J-shaped hook member 42 is utilized instead of VELCRO coupling means. Additionally, the strap member 37 is fabricated of rigid material. The J-shaped hook member extends from the second end of the strap. When utilizing this embodiment the hook is secured around the male seat belt buckle and the handle, strap and seat belt are threaded through the baby seat in the manner set forth above. Note FIG. 4.

Figure 5:
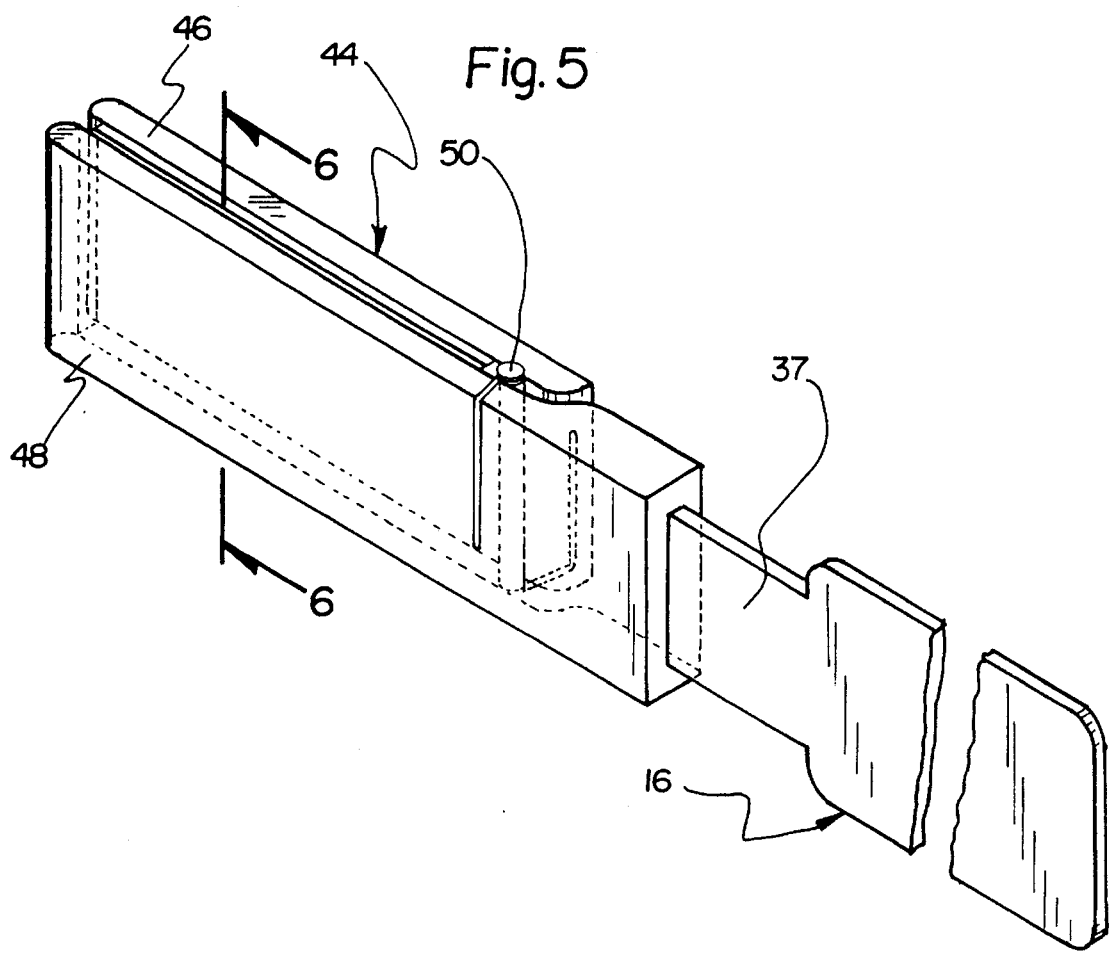
FIG. 5 is an isolated perspective view of the extension belt in a third alternate embodiment illustrating the clamp coupling means thereof.
Figure 6:
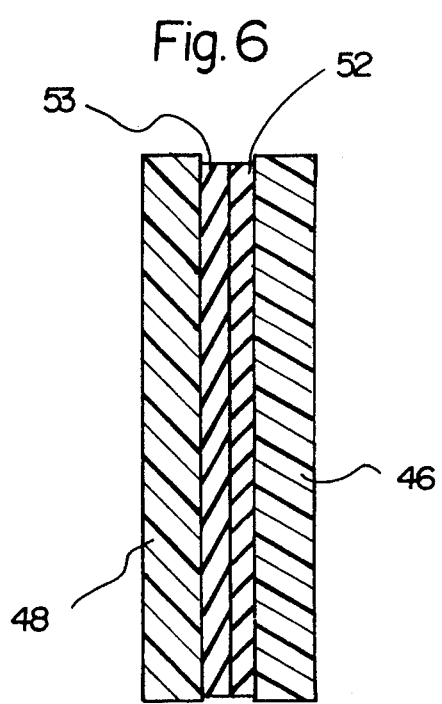
FIG. 6 is a cross sectional view taken along section line 6—6 of FIG. 5.

A third alternate embodiment of the present invention is shown in FIGS. 5 and 6. Such embodiment includes substantially all of the components of the present invention except that a clamp 44 is utilized instead of VELCRO coupling means. Additionally, the strap member 37 is fabricated of rigid material. The clamp includes an upper plate 46, a lower plate 48 and a resilient tension spring 50 coupling the plates together. The upper and lower plates each have an inner surface 52, 53 which includes rubber for frictionally gripping a seat belt. In an operative orientation a user rotates the upper plate relative to the lower plate to position the seat belt between the plates. The user then releases the upper plate whereby the resilient tension spring causes the rubber inner surface of the upper plate to tightly secure the seat belt against the rubber inner surface of the lower plate. The handle, strap and seat belt are then threaded through the baby seat in the manner set forth above. Note FIGS. 5 and 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved seat belt threader assembly for child safety seats comprising, in combination:

a child safety seat including a back member having slots positioned therethrough:

a seat belt including a male buckle member, the seat belt being operatively coupled to recoil means;

a handle fabricated of rigid plastic and formed in an elongated planar rectangular configuration with a first end and a second end, the second end having a central region, the handle having four rounded corners and a width of about 1½ inches; and a strap member formed in an elongated planar rectangular configuration with a front face and a rear face, the strap member having about one half the length and width of the handle, the strap member being flexible and having a first end, a second end and a center point, the first end of the strap member being formed integrally with the central region of the second end of the handle, the handle and the strap member having a length of about 20 inches, the front face of the strap member including female hook and loop fasteners affixed thereto between the center point and first end thereof, the front face of the strap member including male hook and loop fasteners affixed thereto adjacent to the second end thereof, in an operative orientation a user folding the strap member around the male buckle member of the seat belt and tightly coupling the male and female hook and loop fasteners together, the user then threading the handle, strap member and seat belt through the slots of the baby seat.

* * * * *